No. 791,525.                                                    Patented June 6, 1905.

UNITED STATES PATENT OFFICE.

HUGO WITTER, OF ELBERFELD, GERMANY, ASSIGNOR TO FARBENFABRIKEN OF ELBERFELD CO., OF NEW YORK, N. Y., A CORPORATION OF NEW YORK.

YELLOW DYE.

SPECIFICATION forming part of Letters Patent No. 791,525, dated June 6, 1905.

Application filed March 13, 1905. Serial No. 249,814.

*To all whom it may concern:*

Be it known that I, HUGO WITTER, doctor of philosophy, chemist, (assignor to the FARBENFABRIKEN OF ELBERFELD COMPANY, of New York,) residing at Elberfeld, Germany, have invented a new and useful Improvement in Yellow Coloring-Matter; and I hereby declare the following to be a clear and exact description of my invention.

My invention relates to the production of new tetrazo dyestuffs which dye wool yellow shades fast to milling and do not stain the interwoven white cotton or wool.

The new dyestuffs can be obtained by combining with one molecular proportion of phenylmethylpyrazolon and one molecular proportion of alpha-methylindol (methylketol) the tetrazotized derivatives of benzidin- or tolidin-meta-disulfonic acid, having the following general formula:

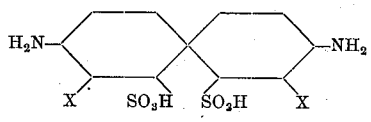

in which formula X means hydrogen atoms which can be replaced by the methylic group.

The new coloring-matters are, in the shape of their alkaline salts, brownish powders soluble in water and in concentrated sulfuric acid with a yellow color and yielding upon reduction with stannous chlorid and hydrochloric acid the diamido-diaryldisulfonic acids of the above-given general formula amidomethylphenylpyrazolon and amido-alphamethylindol. They dye wool from acid-baths yellow shades fast to milling.

In carrying out my invention practically I can proceed as follows, (the parts being by weight:) Three hundred and forty-four parts of benzidin-meta-disulfonic acid are diazotized in the usual manner with the aid of one hundred and thirty-eight parts of sodium nitrite and hydrochloric acid, and to the resulting tetrazo compound a solution of one hundred and forty parts of alpha-methylindol in one thousand parts of hydrochloric acid (20° Baumé) is added. After the addition of an excess of sodium acetate it is stirred until the formation of the intermediate compound is completed. When this point is reached, one hundred and ninety parts of phenyl-methyl-pyrazolon dissolved in dilute hydrochloric acid are added, and then the free mineral acid is saturated for the most part by the addition of sodium acetate. After about twelve hours the combination will be completed. The dyestuff thus obtained is then isolated in the usual manner. The same dyestuff results on combining the tetrazo compound at first with phenylmethylpyrazolon and then with alpha-methylindol. The new dyestuff thus obtained is, after being dried and pulverized, a brownish powder soluble in water and in concentrated sulfuric acid with a yellow color. Upon treatment with stannous chlorid and hydrochloric acid benzidin-meta-disulfonic acid, amidomethylphenylpyrazolon and amido-alpha-methylindol is obtained. It dyes wool from acid-baths yellow shades.

The process proceeds in an analogous manner on replacing the benzidin-meta-disulfonic acid by the tolidin-meta-disulfonic acid.

Having described my invention and in what manner the same is to be performed, what I claim as new, and desire to secure by Letters Patent, is—

1. The herein-described new tetrazo dyestuffs obtainable by the combination of the tetrazo compounds of the para-diamin-disulfonic acids having the above-given general formula with one molecular proportion of alpha-methylindol and one molecular proportion of phenylmethylpyrazolon, which dyestuffs are in the shape of their alkaline salts brownish powders soluble in water and in concentrated sulfuric acid with a yellow color; yielding on reduction with stannous chlorid and hydrochloric acid the diamidodiaryldisulfonic acids of the above-given formula, amidomethylphenylpyrazolon and amidoalphamethylindol; dyeing wool yellow shades fast to milling, substantially as hereinbefore described.

2. The herein-described new tetrazo dyestuff obtainable by the combination of the tetrazo compound of benzidin-meta-disulfonic acid with one molecular proportion of phenylmethylpyrazolon and of alpha-methylindol; which dyestuff is in the shape of its sodium salt a brownish powder soluble in water and in concentrated sulfuric acid with a yellow color, yielding on suitable treatment with stannous chlorid and hydrochloric acid benzidin-meta-disulfonic acid, amidomethylphenylpyrazolon and amidoalpha-methylindol; and dyeing wool from acid-baths yellow shades, substantially as hereinbefore described.

In testimony whereof I have signed my name in the presence of two subscribing witnesses.

HUGO WITTER.

Witnesses:
  OTTO KÖNIG,
  J. A. RUTHERSHAUS.